US010323942B2

(12) United States Patent
Werner et al.

(10) Patent No.: US 10,323,942 B2
(45) Date of Patent: Jun. 18, 2019

(54) USER-SPECIFIC LEARNING FOR IMPROVED PEDESTRIAN MOTION MODELING IN A MOBILE DEVICE

(71) Applicant: QUALCOMM Incorporated, San Diego, CA (US)

(72) Inventors: Benjamin Werner, Sunnyvale, CA (US); William Morrison, San Francisco, CA (US); Ning Luo, Cupertino, CA (US); Ming Sun, Sunnyvale, CA (US); Joseph Czompo, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 244 days.

(21) Appl. No.: 15/275,014

(22) Filed: Sep. 23, 2016

(65) Prior Publication Data

US 2018/0087903 A1    Mar. 29, 2018

(51) Int. Cl.
*H04W 4/38* (2018.01)
*G01C 21/14* (2006.01)
(Continued)

(52) U.S. Cl.
CPC ............. *G01C 21/14* (2013.01); *G01C 21/16* (2013.01); *G01C 21/165* (2013.01);
(Continued)

(58) Field of Classification Search
CPC .......... G06N 99/005; G06N 7/00; G06N 5/04; G06N 20/00; G06N 5/046; G06F 19/00; G06F 3/017; G06F 17/5009; G06F 2221/2111; G01C 21/16; G01C 21/3484; G01C 22/006; G01C 21/005; G01C 21/20; G01C 21/14; G01C 21/165; G01C 21/28; H04W 4/029; H04W 4/027; H04W 4/02; H04W 4/025; H04W 4/38; H04W 4/33; H04W 4/80; G01S 17/026; G01S 17/89; G01S 5/0252; G01S 19/42; G01S 1/08; G01S 5/021; G01S 5/0278; G01S 19/26; G01S 19/49; G01S 13/006; G01S 9/42;
(Continued)

(56) References Cited

U.S. PATENT DOCUMENTS 6,236,908 B1 * 5/2001 Cheng ................. F02D 41/0062
701/1
8,578,773 B1    11/2013 Feng et al.
(Continued)

OTHER PUBLICATIONS

International Search Report and Written Opinion—PCT/US2017/050411—ISA/EPO—dated Dec. 19, 2017.

*Primary Examiner* — Olumide Ajibade Akonai
(74) *Attorney, Agent, or Firm* — Thien T. Nguyen

(57) ABSTRACT

Techniques provided herein are directed toward enabling on-device learning to create user-specific movement models that can be used for dead reckoning. Because these moving models are user-specific, they can be later used to identify user-specific motions in a manner that provides for a dead reckoning location estimation. In some embodiments, these models can be focused on pedestrian movement, based on the repetitive motion that occurs when a user takes a stride (walking, jogging, running, etc.) or other repetitive motion (swimming, riding a horse, etc.).

30 Claims, 6 Drawing Sheets

(51) Int. Cl.
  *G01C 21/16* (2006.01)
  *G01C 22/00* (2006.01)
  *G01S 19/26* (2010.01)
  *G01S 19/49* (2010.01)
  *H04W 4/029* (2018.01)
  *H04W 4/33* (2018.01)
(52) U.S. Cl.
  CPC ............ *G01C 22/006* (2013.01); *G01S 19/26* (2013.01); *G01S 19/49* (2013.01); *H04W 4/029* (2018.02); *H04W 4/33* (2018.02); *H04W 4/38* (2018.02)
(58) Field of Classification Search
  CPC ........ G06K 17/0022; G06K 2017/0045; G06T 2207/20081
  See application file for complete search history.

(56) References Cited

U.S. PATENT DOCUMENTS

| | | | |
|---|---|---|---|
| 10,055,675 B2* | 8/2018 | Micks | G01S 13/006 |
| 2003/0018430 A1 | 1/2003 | Ladetto et al. | |
| 2011/0029277 A1 | 2/2011 | Chowdhary et al. | |
| 2012/0303271 A1 | 11/2012 | Chowdhary et al. | |
| 2012/0310587 A1* | 12/2012 | Tu | G01D 1/16 |
| | | | 702/141 |
| 2014/0142885 A1 | 5/2014 | Chowdhary et al. | |
| 2015/0316578 A1 | 11/2015 | Pakzad et al. | |
| 2016/0169703 A1 | 6/2016 | Omr et al. | |
| 2017/0095181 A1* | 4/2017 | Hauenstein | A61B 5/1118 |
| 2018/0007382 A1* | 1/2018 | Pio | H04N 19/52 |
| 2018/0180443 A1* | 6/2018 | Han | G01C 22/006 |

* cited by examiner

USER-SPECIFIC LEARNING FOR IMPROVED PEDESTRIAN MOTION MODELING IN A MOBILE DEVICE

BACKGROUND

A mobile device (such as a cellular telephone, a smart phone, a tablet computer, a laptop computer, a wearable computer, a navigation and/or tracking device, etc.) may be enabled to determine its location through the use of location determination technology including global navigation satellite system (GNSS), trilateration using fixed base stations or access points, and/or the like. Location determination technology may additionally or alternatively include using sensors on the mobile device for dead reckoning. Micro-Electro-Mechanical Systems (MEMS)-based and non-MEMS-based sensors can include accelerometers, gyroscopes, magnetometers, and/or other MEMS-based sensors.

Problematically, however, the accuracy of MEMS-based dead reckoning degrades over time and distance due to cumulative MEMS sensor errors. Also, for location determination solutions that additionally use wireless communication, this can lead to more frequent use of other relatively high-power technologies (e.g. GNSS, WiFi, etc.) to maintain target accuracy.

SUMMARY

Techniques provided herein are directed toward enabling on-device learning to create user-specific movement models that can be used for dead reckoning. Because these moving models are user-specific, they can be later used to identify user-specific motion in a manner that provides for a dead reckoning location estimation that is relatively highly accurate. In some embodiments, these models can be focused on pedestrian movement, based on the repetitive motion that occurs when a user takes a stride (walking, jogging, running, etc.).

An example mobile device, according to the description, comprises one or more micro electromechanical system (MEMS)-based sensors configured to provide MEMS sensor data indicative of motion of a user, and a processing unit communicatively coupled with the MEMS-based sensors. The processing unit may be configured to, in a training phase, collect, from the MEMS-based sensors, a first set of MEMS sensor data over a first period of time in which the user makes multiple strides and create a movement model associated with the first set of MEMS sensor data based on the first set of MEMS sensor data and a reference trajectory to determine a weighting function that amplifies along-track motion over a stride, attenuates cross-track motion over the stride, or both. The processing unit may further be configured to, subsequent to the training phase, collect, from the MEMS-based sensors, a second set of MEMS sensor data over a second period of time in which motion is detected by the MEMS-based sensors, determine if the second set of MEMS sensor data matches the movement model, and responsive to a determination of a match between the second set of MEMS sensor data and the movement model, determine a location of the mobile device using the second set of MEMS sensor data by applying the weighting function corresponding to the movement model to the second set of MEMS sensor data.

The mobile device may comprise one or more of the following features. The mobile device may comprise a global navigation satellite system (GNSS) receiver communicatively coupled with the processing unit, wherein the processing unit is further configured to determine the reference trajectory using information received from the GNSS receiver. The processing unit may be further configured to, in the training phase, collect a plurality of sets of MEMS sensor data, and create a plurality of movement models, each movement model of the plurality of movement models corresponding to a set of MEMS sensor data of the plurality of sets of MEMS sensor data. The processing unit may be configured to create the movement model based on the first set of MEMS sensor data and the reference trajectory comprises transforming the first set of MEMS sensor data to a frame of reference based on the reference trajectory to generate along-track training data and cross-track training data. The processing unit may be configured to determine the weighting function by performing a least squares optimization based on the along-track training data and the cross-track training data. The processing unit may be further configured to generate at least one reference waveform, wherein the movement model comprises the weighting function and the at least one reference waveform. The at least one reference waveform may include a waveform representing vertical movement of the mobile device. The processing unit may be configured to determine if the second set of MEMS sensor data matches the movement model based on a waveform derived from the second set of MEMS sensor data and the at least one reference waveform of the movement model. The processing unit may be configured to determine if the waveform derived from the second set of MEMS sensor data matches the at least one reference waveform of the movement model by performing a correlation operation. The processing unit may be configured to perform the correlation operation by including, in the waveform derived from the second set of MEMS sensor data, the at least one reference waveform of the movement model, or both, a time offset. The processing unit may be configured to determine if the second set of MEMS sensor data matches the movement model by determining that a value of the correlation operation is at least as great as a threshold correlation value.

An example method of pedestrian motion modeling in a mobile device having one or more micro electromechanical system (MEMS)-based sensors, according to the description, comprises in a training phase, collecting, from the MEMS-based sensors, a first set of MEMS sensor data indicative of motion of a user, the first set of MEMS sensor data collected over a first period of time in which the user makes multiple strides, and creating a movement model associated with the first set of MEMS sensor data based on the first set of MEMS sensor data and a reference trajectory to determine a weighting function that amplifies along-track motion over a stride, attenuates cross-track motion over the stride, or both. The method further comprises, subsequent to the training phase, collecting, from the MEMS-based sensors, a second set of MEMS sensor data over a second period of time in which motion is detected by the MEMS-based sensors, determining if the second set of MEMS sensor data matches the movement model, and responsive to a determination of a match between the second set of MEMS sensor data and the movement model, determining a location of the mobile device using the second set of MEMS sensor data by applying the weighting function corresponding to the movement model to the second set of MEMS sensor data.

The method may include one or more of the following features. The method may include determining the reference trajectory using information received from a global navigation satellite system (GNSS) receiver of the mobile device.

The method may include, in the training phase, collecting a plurality of sets of MEMS sensor data, and creating a plurality of movement models, each movement model of the plurality of movement models corresponding to a set of MEMS sensor data of the plurality of sets of MEMS sensor data. Creating the movement model based on the first set of MEMS sensor data and the reference trajectory may comprise transforming the first set of MEMS sensor data to a frame of reference based on the reference trajectory to generate along-track training data and cross-track training data. Determining the weighting function may comprise performing a least squares optimization based on the along-track training data and the cross-track training data. The method may further comprise generating at least one reference waveform, wherein the movement model comprises the weighting function and the at least one reference waveform. The at least one reference waveform may include a waveform representing vertical movement of the mobile device. Determining if the second set of MEMS sensor data matches the movement model may be based on a waveform derived from the second set of MEMS sensor data and the at least one reference waveform of the movement model. Determining if the waveform derived from the second set of MEMS sensor data matches the at least one reference waveform of the movement model may comprise performing a correlation operation. Performing the correlation operation may comprise including, in the waveform derived from the second set of MEMS sensor data, the at least one reference waveform of the movement model, or both, a time offset. Determining if the second set of MEMS sensor data matches the movement model comprises determining that a value of the correlation operation is at least as great as a threshold correlation value.

An example apparatus, according to the description, comprises means for detecting motion, means for collecting, in a training phase, a first set of motion data from the means for detecting motion, the first set of motion data indicative of motion of a user and collected over a first period of time in which the user makes multiple strides, and means for creating, in the training phase, a movement model associated with the first set of motion data based on the first set of motion data and a reference trajectory to determine a weighting function that amplifies along-track motion over a stride, attenuates cross-track motion over the stride, or both. The apparatus further comprises means collecting, subsequent to the training phase, a second set of motion data from the means for detecting motion, the second set of motion data collected over a second period of time in which motion is detected, means for determining if the second set of motion data matches the movement model, and means for determining, responsive to a determination of a match between the second set of motion data and the movement model, a location of the apparatus using the second set of motion data by applying the weighting function corresponding to the movement model to the second set of motion data.

The apparatus may comprise one or more of the following features. The apparatus may further comprise means for determining the reference trajectory using information received from a global navigation satellite system (GNSS) receiver. The apparatus may further comprise means for collecting, in the training phase, a plurality of sets of motion data, and means for creating, in the training phase, a plurality of movement models, each movement model of the plurality of movement models corresponding to a set of motion data of the plurality of sets of motion data. The means for creating the movement model based on the first set of motion data and the reference trajectory may comprise means for transforming the first set of MEMS sensor data to a frame of reference based on the reference trajectory to generate along-track training data and cross-track training data. The means for determining the weighting function comprises means for performing a least squares optimization based on the along-track training data and the cross-track training data. The apparatus may further comprise means for generating at least one reference waveform, wherein the movement model comprises the weighting function and the at least one reference waveform. The at least one reference waveform may include a waveform representing vertical movement of the mobile device.

An example non-transitory computer-readable medium, according to the description, has computer-executable instructions embedded thereon for pedestrian motion modeling in a mobile device having one or more micro electromechanical system (MEMS)-based sensors. The instructions including computer code for, in a training phase, collecting, from the MEMS-based sensors, a first set of MEMS sensor data indicative of motion of a user, the first set of MEMS sensor data collected over a first period of time in which the user makes multiple strides, and creating a movement model associated with the first set of MEMS sensor data based on the first set of MEMS sensor data and a reference trajectory to determine a weighting function that amplifies along-track motion over a stride, attenuates cross-track motion over the stride, or both. The instructions further comprise computer code for subsequent to the training phase, collecting, from the MEMS-based sensors, a second set of MEMS sensor data over a second period of time in which motion is detected by the MEMS-based sensors, determining if the second set of MEMS sensor data matches the movement model, and responsive to a determination of a match between the second set of MEMS sensor data and the movement model, determining a location of the mobile device using the second set of MEMS sensor data by applying the weighting function corresponding to the movement model to the second set of MEMS sensor data.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Various example techniques are provided herein which may be implemented at a mobile device to support positioning capabilities, at least in part, by enabling the mobile device to create user-specific movement models that can be used for dead reckoning determinations.

It will be understood that, although embodiments described the utilization of Micro-Electro-Mechanical Systems (MEMS)-based sensors, the techniques described herein can be employed where other types of sensors are used. Furthermore, it should be understood that in various embodiments disclosed herein, data from non-MEMS-based sensors, for example solid state magnetometers and other kinds of sensors, can also be used along with data from MEMS-based sensors to perform the various calculations and determinations disclosed herein. Hence, reference to MEMS-based sensors should not be understood to exclude the use of data from non-MEMS sensors instead of, or in conjunction with, MEMS-based sensors.

Dead reckoning can be utilized by mobile device to determine a location of the mobile device based on MEMS sensor data from MEMS sensors integrated into the device itself. Problematically, however, it can be difficult to obtain an accurate location estimate from dead reckoning because of the wide variety of movements that the mobile device may undergo (as sensed by the MEMS sensors). For example, motion sensed by MEMS sensors of a mobile device while a user is walking (or jogging, running, etc.) can vary widely from user to user. This motion can further vary depending on where the mobile device is in relation to the user (for example, in a user's pocket, in a user's hand, held in front of the user's face, etc.).

Techniques are provided herein to solve this and other problems, increasing the accuracy of location estimates based on dead reckoning by creating movement models that can be specific to a user and the mobile device's positioned in relation to the user. Such techniques may be utilized in embodiments where dead reckoning may be one of several location determining technologies utilized in a positioning system.

Figure 1:
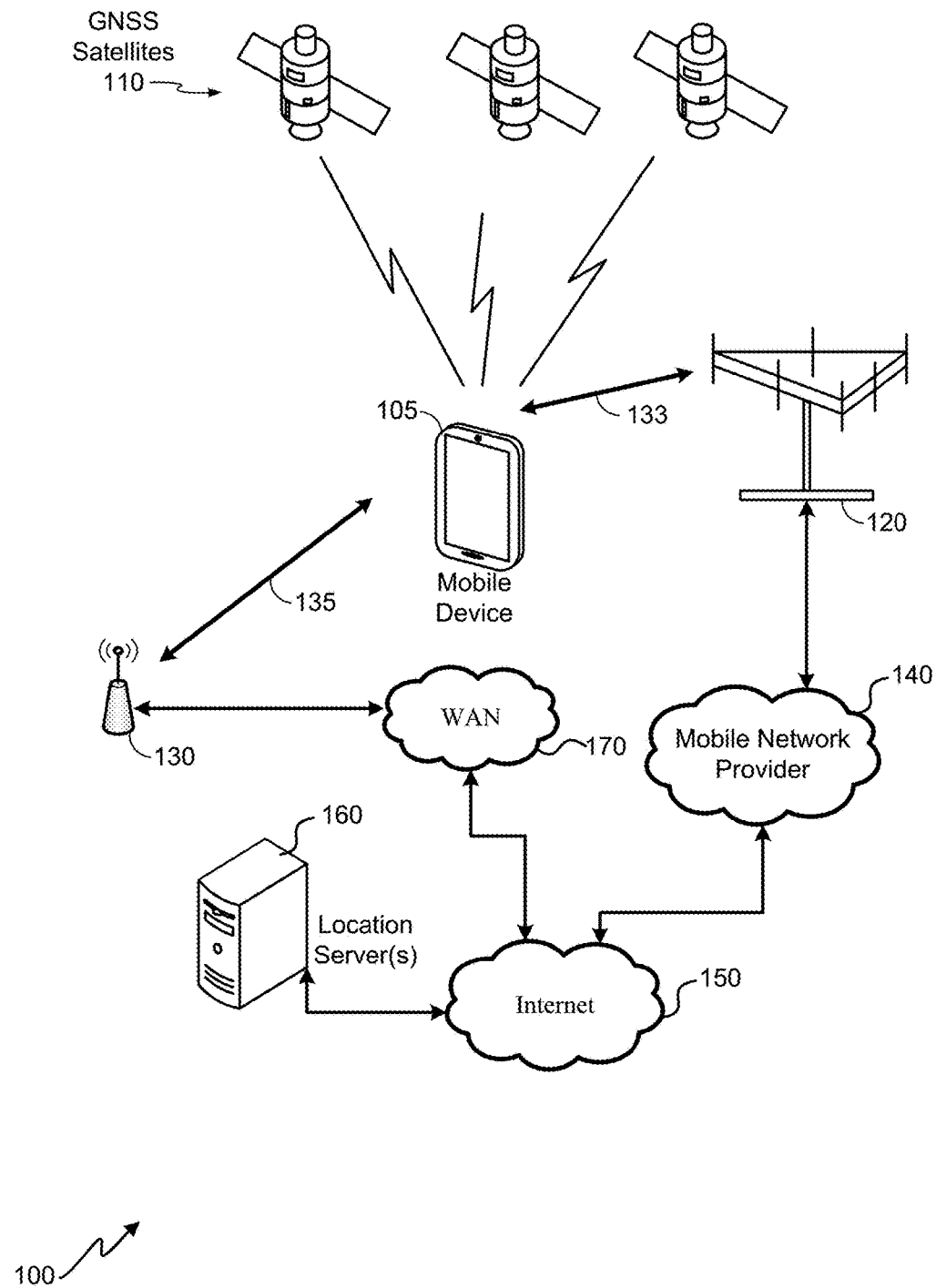
FIG. 1 is a simplified illustration of a positioning system, according to an embodiment.

FIG. 1 is a simplified illustration of a positioning system 100 in which a mobile device 105 and/or other components of the positioning system 100 can use the techniques provided herein for helping improve the accuracy of dead reckoning estimations, according to an embodiment. The techniques described herein may therefore be implemented by one or more components of the positioning system 100. The positioning system can include a mobile device 105, global navigation satellite system (GNSS) satellite vehicles (SVs) 110, base transceiver station(s) 120, mobile network provider 140, access point(s) (AP(s)) 130, location server(s) 160, wireless area network (WAN) 170, and the Internet 150. It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may be utilized in the positioning system 100. Similarly, the positioning system 100 may include many antennas 120 and/or APs 130. The illustrated connections that connect the various components in the positioning system 100 comprise data connections which may include additional (intermediary) components, direct or indirect connections, and/or additional networks. Furthermore, components may be rearranged, combined, separated, substituted, and/or omitted, depending on desired functionality. A person of ordinary skill in the art will recognize many modifications to the components illustrated.

The antenna 120 is communicatively coupled to the mobile network provider 140 which may be communicatively coupled with the Internet 150. In some embodiments, the antenna 120 may comprise a base station of a cellular network, which may employ any of a variety of wireless technologies, as described herein below with regard to FIG. 8. The location server(s) 160 can also be communicatively coupled with the Internet 150. Thus, the mobile device 105 can communicate information with the location server(s) 160, for example, by accessing the Internet 150 via the antenna 120 using a first communication link 133. Additionally or alternatively, because an AP 130 and WAN 170 also may be communicatively coupled with the Internet 150, the mobile device 105 may communicate with the location server(s) 160 using a second communication link 135.

Depending on desired functionality, a location of the mobile device 105 can be determined in any of a variety of ways, by the mobile device and/or other devices in communication with the mobile device, which may be situation dependent. In some embodiments, the location server(s) 160 and/or other devices (not shown) remote to the mobile device 105, for example, can be used to implement positioning methods for supporting the positioning of a mobile device 105, typically referred to as a target mobile device, target device, or target. These positioning methods may comprise, for example, measurements by a mobile device of signals transmitted by GNSS SVs 110, antennas 120 belonging to a wireless cellular network (e.g., the mobile network provider 140), a access points (APs) 130, and the like. These positioning methods may also include receiving, from the mobile device 105, MEMS sensor data and/or an estimated position based on dead reckoning, which can be provided to the location server(s) 160 to complement other techniques of determining a location of the mobile device 105. In some embodiments, the mobile device 105 may utilize the dead reckoning techniques described herein to determine its position without sending or receiving any information from other components of the positioning system 100.

As noted earlier, dead reckoning may be performed by the mobile device 105 and/or other components of the positioning system 100. For pedestrian navigation (that is, navigation in which a pedometer is used to determine steps of a pedestrian), dead reckoning can be one of several data points used to determine an accurate location estimate of the mobile device 105. Dead reckoning can utilize three different data sources: (1) an indication of a step (e.g., as provided by a pedometer), (2) a relative turn angle (e.g., which may be provided by a gyroscope), and (3) a course over ground (COG), which provides a velocity vector (direction and magnitude of velocity).

The COG for dead reckoning may be determined by using MEMS sensor data from MEMS sensors of the mobile device 105. In some embodiments, for example, nine axes of information may be utilized: three axes for each of an accelerometer, a gyroscope, and a magnetometer. This information may be processed to determine the COG velocity vector.

As previously noted, location estimation based on dead reckoning can be inaccurate due to variations in the movement of the mobile device while the user of the mobile device is walking. In particular, the baseline algorithms that are used to determine the COG may not be able to accurately determine the COG due to the variation in this movement (due to, for example, movements specific to the user, variations in the location of the mobile device relative to the user, and the like). However, techniques provided herein enable a mobile device to "learn" how different movements for particular user may affect a COG determination, then later identify the particular movements and compensate the COG determination accordingly.

Figure 2:
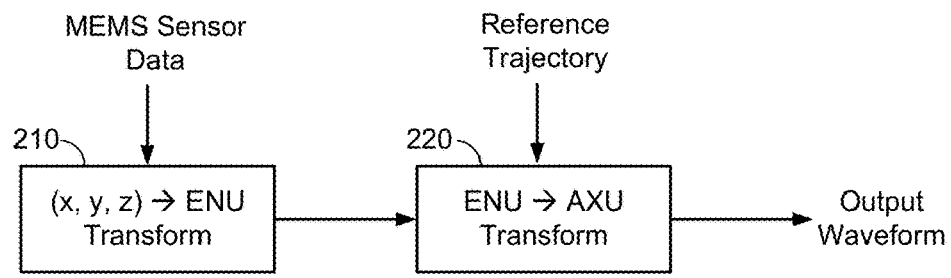
FIG. 2 is a simplified block diagram that illustrates how MEMS sensor data can be used to obtain an output waveform, according to an embodiment.

FIG. 2 is a simplified block diagram that illustrates an embodiment of how MEMS sensor data can be used to obtain a waveform with which a mobile or other device may create a movement model to allow for more accurate COG determinations. It will be understood that components illustrated in FIG. 2 may comprise software and/or hardware components of a mobile device (such as the mobile device 105 of FIG. 1) or other electronic device (such as a server) in a positioning system. Software and/or hardware components of a mobile device are described in more detail in regard to FIG. 7 below.

A first transform component 210 can be used to transform data in a (x, y, z) reference frame to an "East, North, Up" (ENU) reference frame. More specifically, the first transform component 210 can receive MEMS sensor data (which can be raw data from the MEMS sensors of the mobile device; e.g., the nine axes of information discussed previously) in an (x, y, z) coordinate reference frame (e.g., an internal accelerometer reference frame of the mobile device), and transform the data to an ENU reference frame, where "East" and "North" of the ENU reference frame create an "East-North plane" or "local tangent plane" that establishes horizontal movement of the mobile device. The third axis in the ENU reference frame is an "up" reference frame representing a vertical axis relative to the East-North plane. In one example, data from a mobile device's accelerometer may be used to determine data in a (x, y, z) reference frame. Known methods can be used to transform the data from the (x, y, z) reference frame to the ENU reference frame using additional data from one or more of a magnetometer or a gyroscope. In some embodiments, one or both of the magnetometer or gyroscope is a non-MEMS sensor. In an embodiment, data from such non-MEMS sensors can be used to transform MEMS sensor data. Hence, subsequent computations, calculations, or determinations remain based on the MEMS sensor data even if data from non-MEMS sensors is also additionally used.

The data in the ENU reference frame may be further transformed by a second transform component 220, for example, during a training phase of a mobile device, where, in one example, sensor data cannot be matched to a previously stored movement model. Here, the second transform component receives the transformed MEMS sensor data in the ENU reference frame (the output of the first transform component 210) as well as a reference trajectory to then transform the ENU-transformed MEMS sensor data into an "along, cross, up" (AXU) reference frame. In the AXU reference frame, the horizontal plane is formed by an "along-track" axis and "cross-track" axis, where the "along-track" axis is the direction of the reference trajectory (the primary direction of movement). The reference trajectory can be determined using known course over ground techniques, as well as other techniques disclosed later herein.

Figure 3:
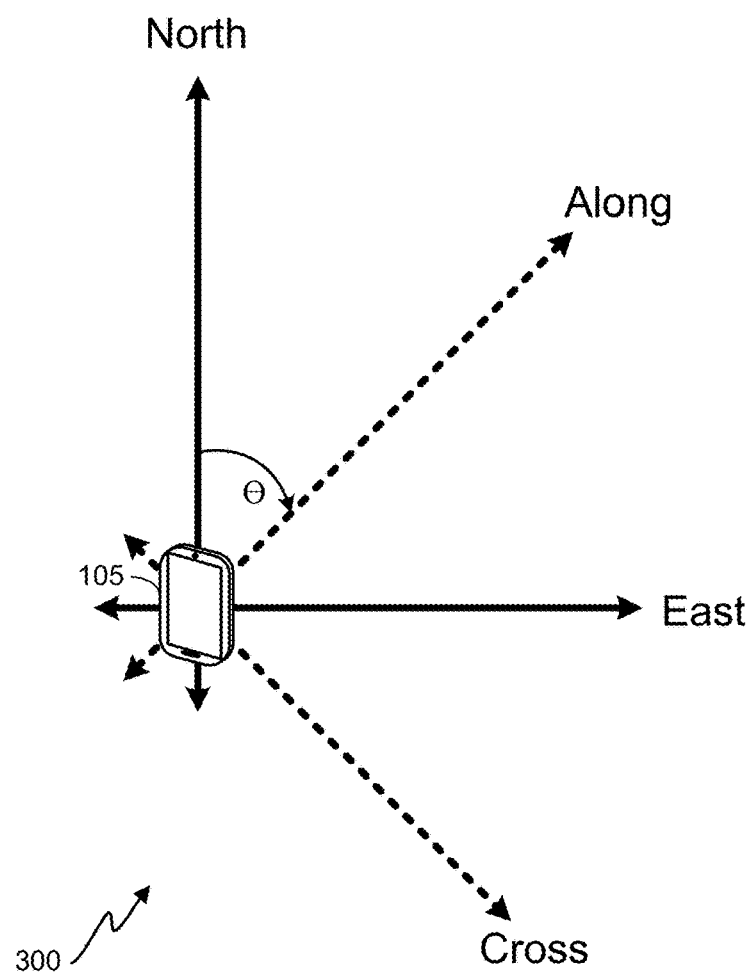
FIG. 3 is a graph 300 that helps illustrate how the horizontal plane of an "East, North, Up" (ENU) reference frame may be transformed to the horizontal plane of "Along-track, Cross-track, Up" (AXU) reference frame, according to an embodiment.

FIG. 3 is a graph 300 that helps illustrate how the horizontal plane of the ENU reference frame may be transformed to the horizontal plane of the AXU reference frame, according to an embodiment. Here, the "North" and "East" axes of the ENU reference frame may be established by the first transform component 210 of FIG. 2, and they may correspond with North and East directions on the earth's surface. Thus, the "North" and "East" axes of the ENU reference frame can form a horizontal plane parallel to the surface of the earth.

The AXU reference frame is established from motion of the mobile device 105. That is, a primary direction of movement of the mobile device 105 can be established (for example using global positioning system GPS and/or another GNSS tracking solution), and the along-track axis can be established along that primary direction of movement. The cross-track axis can be established as perpendicular from the along-track axis in the ENU reference frame. Thus the along-track and cross-track axes of the AXU reference frame are established in the north/east horizontal plane of the ENU, with some offset angle, $\theta$, as illustrated in the graph 300 of FIG. 3.

The ability to perform the transforms illustrated in FIGS. 2 and 3 enable a mobile device to be "trained" to identify different types of motion from a particular user of the mobile device. In particular, sensor errors used in dead reckoning can be mitigated by the mobile device by modeling periodic movements (e.g., steps) made by user for different types of movement. This modeling can be established during the training process.

According to some embodiments, a mobile device can be trained as follows:

First, a mobile device may begin the training process by entering a training mode. The training mode may be invoked during a set up procedure of the mobile device and/or at some point after initial use. According to some embodiments, the training mode may be invoked through the use of a user interface (such as a graphical user interface (GUI) on the mobile device's display), which may prompt a user to begin the training mode. According to some embodiments, a mobile device may only invoke the training mode after determining that motion models have not yet been established and/or a reference trajectory is available (e.g., via GNSS, terrestrial trilateration by access points and/or other antennas, and/or the like). For example, as will be discussed further below, the mobile device can try to match current motion data from mobile MEMS sensors with one movement model of a set of movement models. If no match is found, the mobile device my enter a training mode to use the current motion data to establish a new movement model.

In embodiments where the training mode is invoked during a set up procedure or by the user, once the training mode has been invoked, the mobile device may then prompt a user to make a specific type of movement, such as walking with the mobile device in the user's hand while the user holds the mobile device in front of the user's face. In some embodiments, the mobile device may ask the user to take a certain amount of steps or take at least a minimum number of steps (e.g., at least 10 steps) to establish a repetitive motion.

When the user is making the type of movement that will be used for training, the mobile device can record the movement of the mobile device using the mobile device's MEMS sensors, collecting MEMS sensor data as the user makes the type of movement. During this function, the mobile device can also establish a reference trajectory of the movement (e.g., a direction in which the user is walking; the forward direction) using, for example, established location techniques involving GNSS, wireless trilateration, and/or other technologies such as indoor WiFi, visual inertial odometry (VIO), and/or map matching (where map features such as sidewalks, streets, and the like are used to inform trajectory determinations).

Fourth, the mobile device can use the MEMS sensor data and the reference trajectory to produce one or more output waveforms in the manner illustrated in FIG. 2. In one example, the MEMS sensor data input into the transform component 210 of FIG. 2 may comprise an x-axis acceleration, y-axis acceleration, and z-axis acceleration from a MEMS three-axis accelerometer. After transforming to the ENU and then to the AXU frames of reference, three waveforms can be output as A-axis (along-axis) acceleration, X-axis (cross-axis) acceleration, and U-axis (up-axis) acceleration. Here the output waveforms are in the AXU reference frame, thereby isolating movements in the along-track and cross-track (and upward) directions. These output waveforms can be used as training waveforms as will be described with reference to FIG. 4.

Finally, the mobile device can create a weighting function that reduces cross-track movement and/or increases along-track movement, as described with reference to FIG. 4. The weighting function may then be used to multiply real-time data in the ENU frame of reference to reduce cross-track movement and/or increases along-track movement of the real-time data for motions that are similar to the motion for which the weighting function was computed. When dealing with real-time acceleration data, in one embodiment, transformation from the (x, y, z) reference frame to the ENU reference frame may be performed, but a transformation from the ENU reference frame to the AXU reference frame need not be performed. The weighting function may be applies to the acceleration data in the ENU reference frame directly. In addition to using the weighting function to amplify along-track movement relative to cross-track movement in order to improve pedestrian dead reckoning, the mobile device can subsequently use one or more of the output waveforms, or some other waveform derived from the output waveforms, as a reference waveform to compare to future movements detected by the mobile device. When real-time data collected by the mobile device has a waveform matching a given reference waveform (e.g., correlate with the reference waveform above a certain threshold, as described in more detail below), the weighting function associated with the reference waveform can be applied to those movements to help ensure a more determination of COG compared to computations of COG that do not amplify along-track movement relative to cross-track movement. In one example, in a training phase, training acceleration data is transformed from the (x, y, z) reference frame to the ENU reference frame, and then further to the AXU reference frame. Using techniques described elsewhere herein, a weighting function is computed using the along-track axis training acceleration data and the cross-track axis training acceleration data. The up axis acceleration data can serve as a reference waveform. Subsequent to the training phase, real-time acceleration data is received from the MEMS sensor. The real-time acceleration data is transformed to the ENU reference frame. The real-time up axis acceleration data (waveform) is compared to the reference waveform, as described elsewhere herein. A match is found when a given time or phase shift is applied to one, the other, or both, of the reference waveform and the real-time up axis acceleration waveform. The weighting function is then given a time or phase shift based on the time or phase shift used when matching the reference and real-time waveforms, and the weighting function is applied to both the real-time east axis acceleration data and the real-time north axis acceleration data. In this way, motion that is along the direction of motion is amplified relative to motion that is perpendicular to the direction of motion and COG computations and other pedestrian dead reckoning calculations are improved. Additional details regarding the utilization of movement models and weighting functions after training are provided below.

The training process can be repeated for a variety of different movement types (which can also be referred to pedestrian device context which can be a function of one or more of the user using the mobile device, the location of the mobile device on the user's body, and the activity the user is doing), such as walking with the mobile device in the user A's shirt pocket, running with the mobile device in the user B's hand, walking with the mobile device in the user A's front pants pocket, swimming while attached to user A's wrist, swimming while attached to user B's arm, riding a horse while in user A's pocket, and/or the like. More generally, any repetitive motion that is unique in terms of user, location on body, and/or activity, or any combination thereof, can provide a unique movement type/context. This enables the mobile device to create movement models for each of these types of movements, which allows the mobile device to subsequently match similar movements to the movement models, apply the corresponding weighting function for those movement models, and thereby determine a more accurate COG determination. Hence, generally speaking, a mobile device would likely create, through the training process, a plurality of movement models. As described below, each movement model can include a weighting function (or vector) and a reference waveform that can be used, subsequent to the training phase during a use phase (subsequent to the training phase), to determine which movement model best matches current (real-time) MEMS sensor data indicating user motion. If no match is found for already created movement models, the mobile device can use the current (real-time) MEMS sensor data indicating user motion as training data to create a new movement model.

It can be noted that a movement model may include more than a single reference waveform. In some embodiments, for example, a movement model may include one or more of vertical acceleration, a horizontal acceleration (which may be normalized) data, vertical gyroscope (rotation about the vertical axis) data, horizontal gyroscope (rotation about a vertical axis) data, and/or the like as reference waveforms or to generate a reference waveform. One or more reference waveforms could then be used for matching with subsequent movement by the mobile device, in which corresponding waveforms would be compared with the one or more reference waveforms to determine whether the movement is similar. If the movement is similar, the weighting function associated with the one or more reference waveforms can then be applied to the, for example, MEMS sensor data in the ENU reference frame.

Figure 4:
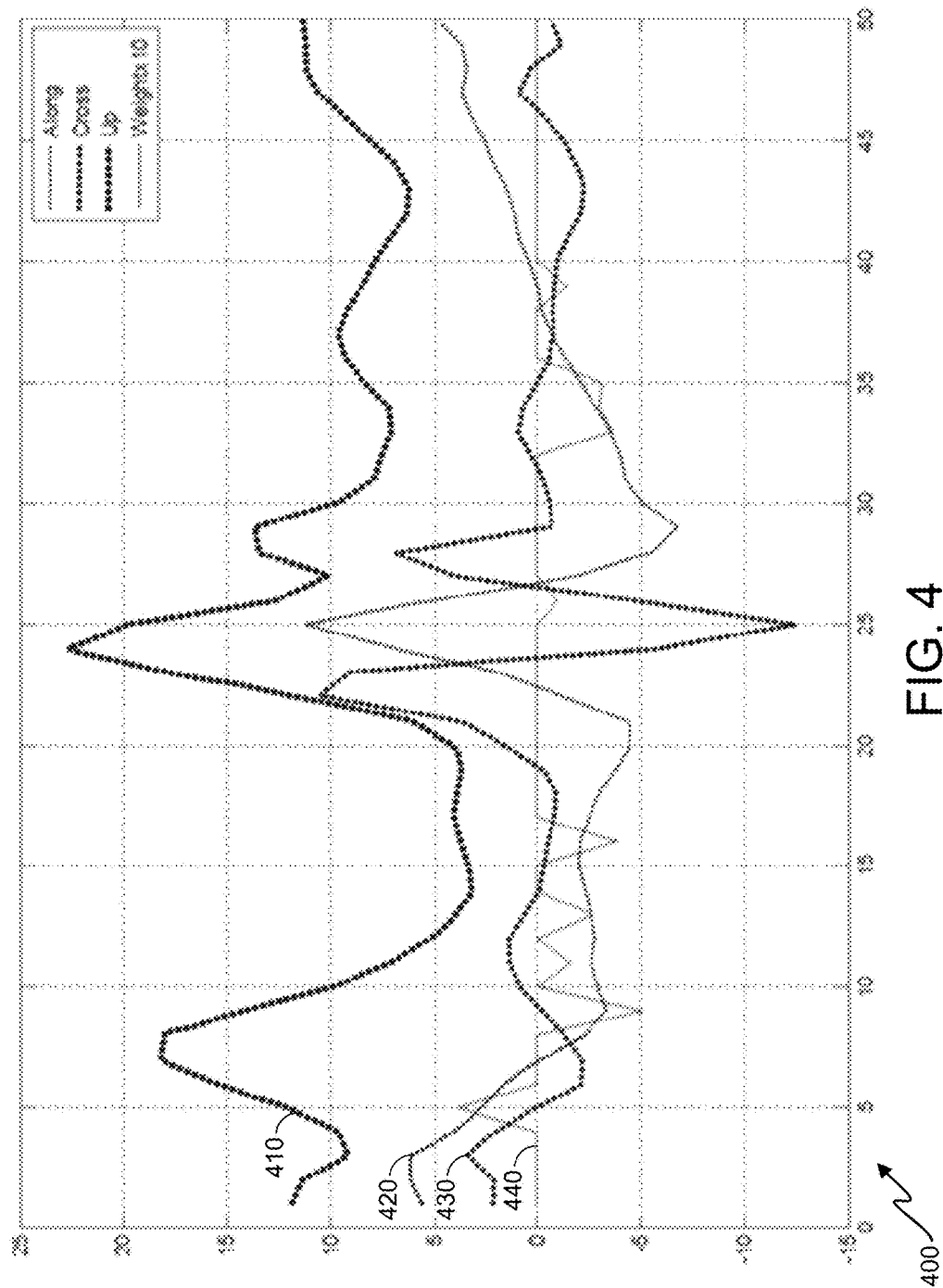
FIG. 4 is a graph that illustrates components of an example output waveform and a corresponding weighting function.

FIG. 4 is a graph 400 that illustrates an example output waveforms (e.g., the output waveforms described in FIG. 2, in the AXU reference frame) and a corresponding weighting function. Here, the output waveforms are decomposed into a vertical ("up") acceleration 410 waveform, along-track acceleration 420 waveform, and cross-track acceleration 430 waveform. In this example, the waveforms are gathered over 50 samples (the X axis of the graph 400), however it will be understood that the number of samples per waveform can vary depending on various factors, such as the speed of the user stride, the sampling rate, and/or similar factors. Additionally, the amplitude of acceleration (the Y axis of the graph 400) can vary in a similar manner. In some embodiments, the amplitude of acceleration may be normalized.

As indicated previously, MEMS sensor data may be transformed to provide the output waveform in the AXU reference frame. The graph 400 represents periodic vertical acceleration 410, along-track acceleration 420, and cross-track acceleration 430. The periodicity of the graph 400 can be measured as a stride of the user. That is, the 50 samples of MEMS sensor data (the X axis of the graph 400) can represent every two steps that a user takes. (For example, the user may step with his/her left foot at around sample 0 and step with his/her right foot at around sample 25.) The output waveform may therefore represent an average, mean, or other representation of a plurality of strides. (For example, the mobile device may take 500 samples of MEMS sensor data over the course of 10 user strides, and the output waveform would represent an averaging, mean, or other combination of the 10 user strides.) A mobile device can determine the periodicity of such movement based on the output waveform itself and/or a pedometer (which may be implemented by the mobile device, e.g., using hardware and/or software to process the MEMS sensor data). For example, periodicity of the wave form may be determined from every other step taken by the user, as detected by the pedometer of the mobile device.

The waveform components for along-track acceleration 420 and cross-track acceleration 430 include an acceleration value for each sample taken in the MEMS sensor data (totaling 50 samples in the example graph 400 of FIG. 4). Determining the weighting function 440 therefore is a matter of determining a function that would maximize along-track acceleration 420 and/or minimize cross-track acceleration 430. According to some embodiments, the weighting function can be determined as follows.

Where A(i) and X(i) respectively represent along-track acceleration 420 and cross-track acceleration 430 vectors at sample i (for i=0 to the total number of samples), a and x can represent scalar values resulting from a dot product of each of vectors A(i) and X(i) with the weighting vector W(i) as follows:

$$a = \Sigma A(i) \cdot W(i) \quad (1)$$

and $$x = \Sigma X(i) \cdot W(i). \quad (2)$$

In some embodiments, a solution for the weighting function or weighting vector, W(i), is determined that minimizes x and maximizes a. In some embodiments, for example, this can be solved by ensuring, or getting close to (within a threshold), $$\arctan\left(\frac{x}{a}\right) = 0. \quad (3)$$

In some embodiments, this solution for W(i) can be computed using a least squares minimization of error algorithm.

According to some embodiments, such as the one illustrated in graph 400, the resulting weighting function 440 (W(i)) may tend to amplify data points within the waveform where along-track acceleration 420 has some nonzero value and the cross-track acceleration 410 has a value that is at or near zero. That said, alternative embodiments may employ other techniques for amplifying along-tracking acceleration 420 and/or minimizing cross-track acceleration 410.

Once movement models and corresponding weighting functions have been determined for various types of movement, a mobile device can then be used to determine COG in an identification or a use phase subsequent to the training phase. During the use phase, a position of the mobile device can be determined that relies, at least in part, on a COG estimate that is derived from weighted acceleration data in, for example, the ENU reference frame, using a weighting function associated with an identified movement model.

For example, when a COG estimate is needed by the mobile device to determine a location of the mobile device with dead reckoning, the mobile device may enter an identification or a use phase in which the mobile device collects MEMS sensor data (e.g., over the course of a plurality of strides) to identify a movement model. Using the transformation process described above, the MEMS sensor data can be converted to an ENU reference frame and compared to movement models previously created by the mobile device. If the mobile device is able to substantially match the waveform of the MEMS sensor data with a reference waveform of a movement model, the mobile device can then apply the weighting function of the movement model to the waveform of the MEMS sensor data to help increase the accuracy of a COG estimate based on the MEMS sensor data.

In some embodiments, for example, the waveform(s) of the MEMS sensor data (which may be in the ENU reference frame) can be decomposed into corresponding E(i) and N(i) functions, to which the weighting function W(i) of the corresponding movement model could be applied as follows:

$$E' = \Sigma E(i) \cdot W(i) \quad (4)$$

and $$N' = \Sigma N(i) \cdot W(i). \quad (5)$$

In one embodiment, the COG estimate based on the weighting function comprises a vector in the East North plane having East coordinate of E' and a North coordinate of N'.

Figure 5:
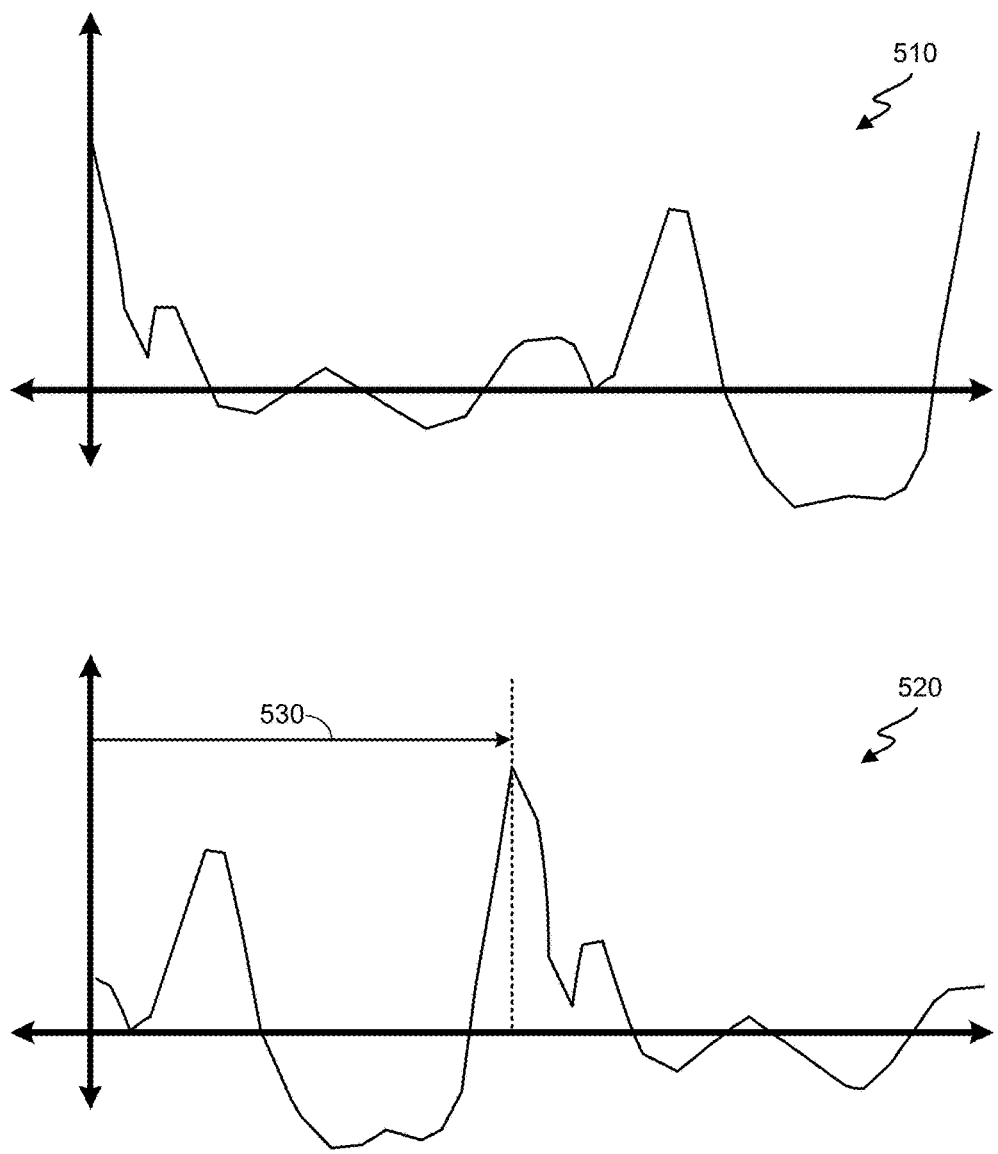
FIG. 5 is an illustration of a set of example graphs to help illustrate how correlation may be determined.

The corresponding movement model can be determined using any of a variety of correlation and/or similar functions. For example, waveform(s) of the MEMS sensor data can be compared with corresponding waveform(s) of each of the movement models created by the mobile device during the training phase using a correlation function relative to one or more reference waveforms, as illustrated in FIG. 5. In one example, up-axis waveforms can serve as reference waveforms, although other waveforms may also be used. For example, a reference waveform may be generated using a horizontal norm (computed using a root sum squared based on movement in the along-cross plane of training data in the AXU reference frame), which may then be compared to a horizontal norm computed from real-time data by computing a root sum squared based on movement in the East-North plane.

FIG. 5 is an illustration of a set of example graphs 510 and 520 to help illustrate how correlation may be determined. Here, a first graph 510 may be a particular waveform (e.g., vertical acceleration) of the MEMS sensor data, and second graph 520 can be the corresponding reference waveform (e.g., vertical acceleration) of a movement model.

As illustrated, there may be a phase shift 530 between the two graphs 510 and 520. As such, a correlation function performed between the two graphs 510 and 520 may be either phase independent or performed at various phase shifts to determine a maximum correlation value between the two graphs 510 and 520.

It can be noted that if the number of samples in the waveform of the MEMS sensor data collected in the identification phase does not match the number of samples in the corresponding waveform of the movement model, the waveform of the MEMS sensor data and/or the waveform of the movement model can be scaled to help ensure they match.

Depending on desired functionality, a correlation between the two graphs 510 and 520 (that is, a determination that the two graphs substantially match) may be determined in any of a variety of ways. In some embodiments, a correlation operation using the two graphs 510 and 520 is performed to determine a correlation value, which can indicate a degree to which the two graphs match (e.g., the higher the correlation value, the more the graphs match). In some embodiments, a threshold correlation value may be determined such that, if a correlation function of the two graphs 510 and 520 results in a correlation value that meets or exceeds the threshold correlation value, the two graphs 510 and 520 are considered to match. Where a movement model and MEMS sensor data each have a set of multiple waveforms (e.g., vertical acceleration, horizontal acceleration, vertical gyro, horizontal gyro, and/or the like), waveforms of the movement model are correlated with corresponding waveforms of the MEMS sensor data, and a combined correlation value (e.g., a summation, average, mean, etc.) can be determined and compared with a threshold combined correlation value to determine whether the waveforms match for purposes of COG estimation.

In some embodiments, a waveform of MEMS sensor data matches a waveform of a movement model if the correlation value exceeds a threshold correlation value and is the highest correlation value among all movement models. That said, some embodiments may simply determine whether a threshold correlation value is exceeded. In other words, depending on the value to which the threshold correlation value is set, a movement model that correlates with MEMS sensor data above a threshold correlation value may provide a sufficiently accurate COG estimation, even if the movement model corresponds to a movement that is different than the movement performed while the MEMS sensor data is acquired by the mobile device.

As illustrated in the example of FIG. 5, graphs 510 and 520 are similar, but are shifted in time from one another. In one embodiment of determining if the real-time MEMS sensor data matches the movement model, a correlation is performed between real-time MEMS sensor data in graph 510 and the reference waveform in graph 520. In this example, several different phase shifts (relative to the stride/waveform, or time shifts relative to time, or position shifts relative to vector location indicator i) may be applied to graph 520. At each phase shift, each value for graph 510 may be multiplied by the corresponding value of shifted graph 520 to form a scalar dot product result. The phase shift with the highest dot product may then be identified. If the highest dot product is above a threshold, it can be determined that the two waveforms match, and the corresponding phase shift also indicates the phase shift 530 between the two graphs. If the highest dot product is below the threshold, no match is found. The real-time MEMS sensor data in graph 510 may then be compared to another reference waveform from another movement model having a graph similar to that illustrated in graph 520.

It is understood that in the description above, the weighting function, the reference waveform, the corresponding waveform of real-time data that is used to match or correlate with the reference waveform, the training or real-time acceleration data are variously referred to as a vector, function, or waveform, and hence the weighting function, weighting vector, and weighting waveform can be understood to all refer to the same thing. This is because, in some examples described above, the weighting function represents a sequence of, say, 50 weights at each index, i, and as the weight can be said to depend upon the index i, it may be said to be a function. At the same time, the weighting function is a set of 50 weights can be understood to be a vector having 50 components. Similarly, a plot of the weighting function against index i can represent the weighting function as a waveform. Similarly, in another example, an East-axis acceleration waveform, vector, or function may refer to the same thing.

Figure 6A:
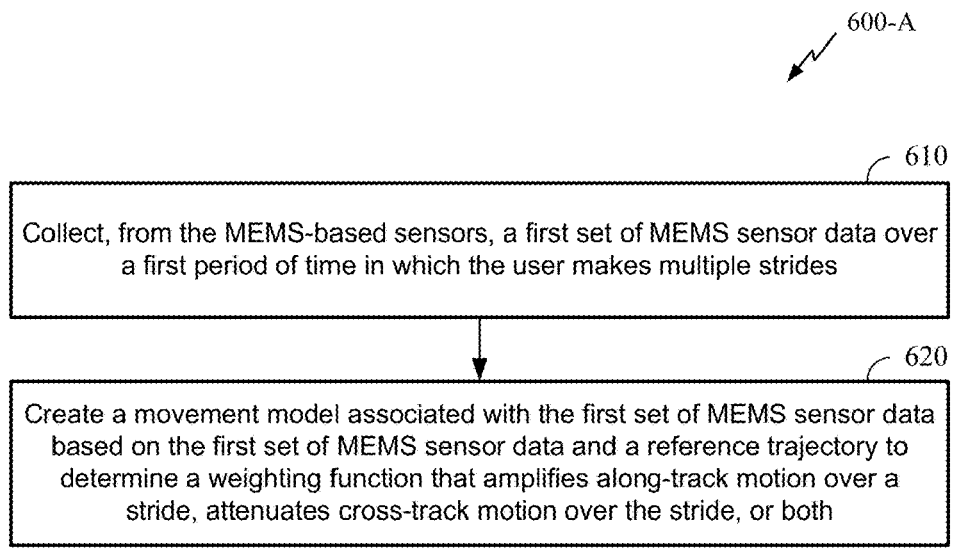
FIGS. 6A and 6B are flow diagrams of methods for determining a location of a mobile device using the techniques described herein, according to an embodiment.
Figure 6B:
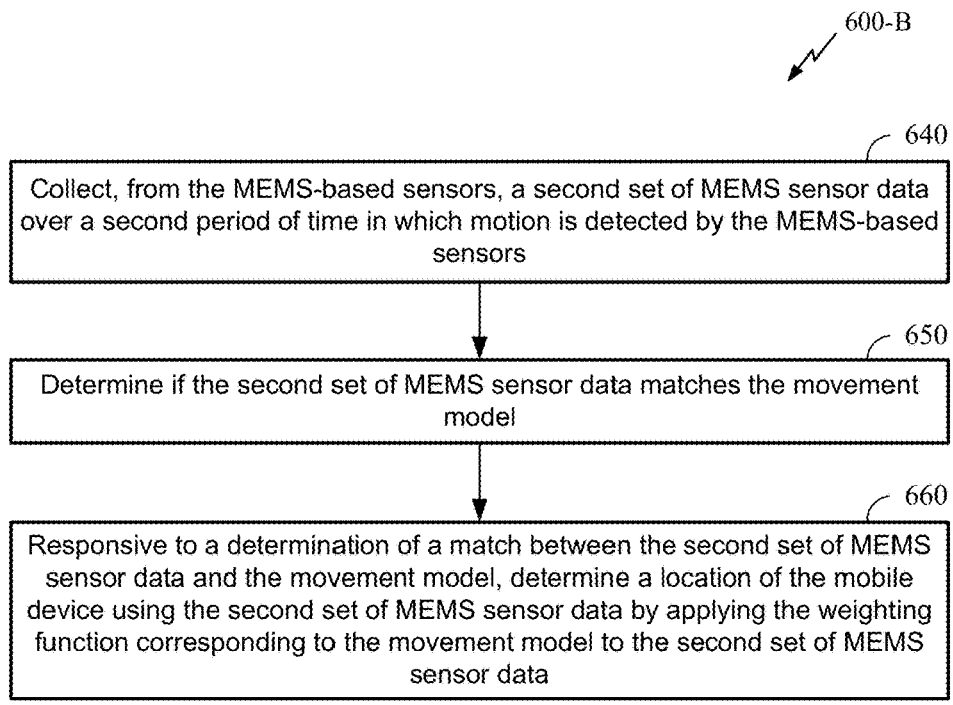
Figure 7:
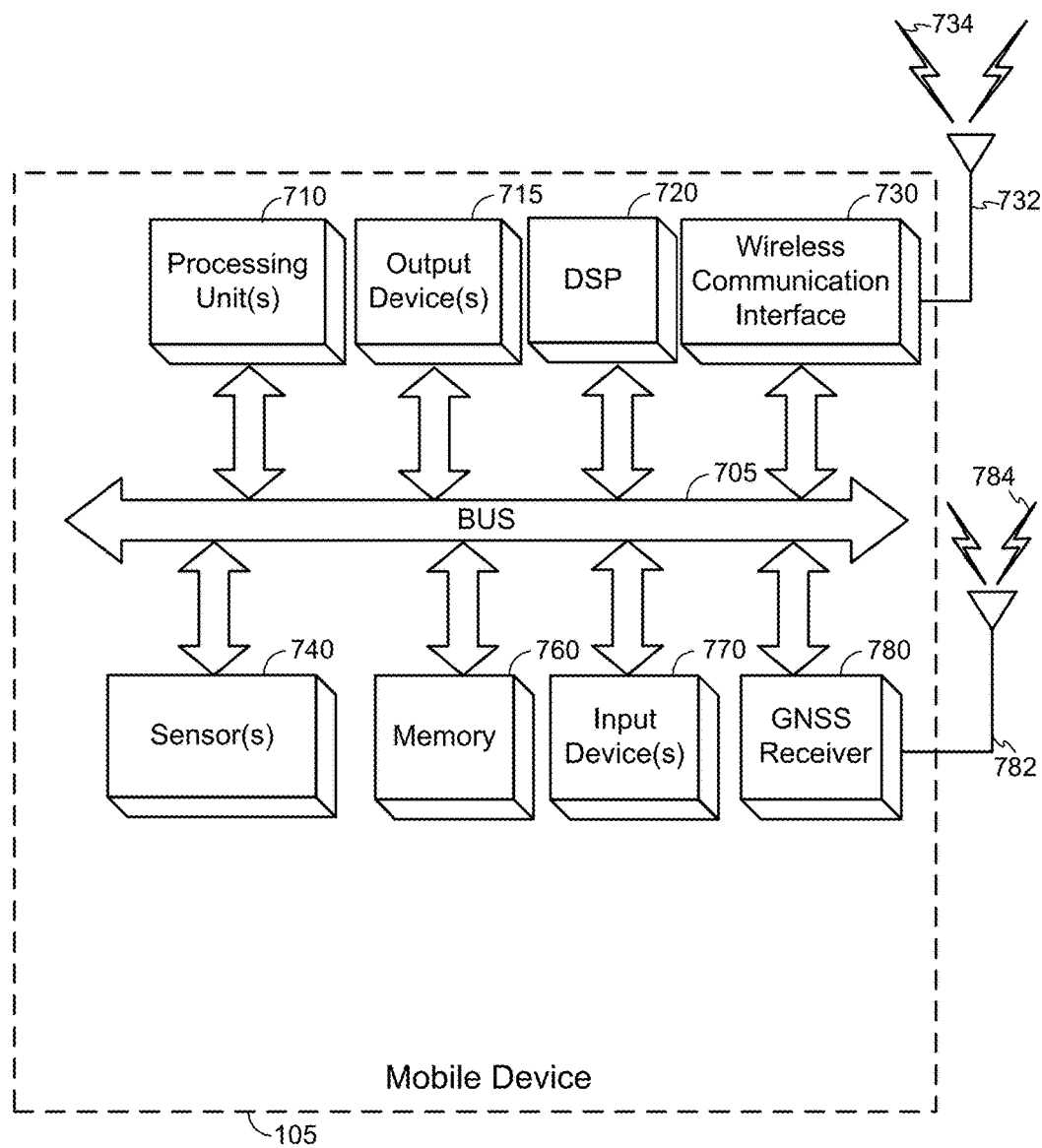
FIG. 7 is a block diagram an embodiment of a mobile device, which can be utilized as described herein above.

FIGS. 6A and 6B are flow diagrams of methods 600-A and 600-B for determining a location of a mobile device using the techniques described herein, according to an embodiment. It can be noted that the functions shown in the blocks illustrated in FIGS. 6A and 6B can be rearranged or altered in alternative embodiments, depending on desired functionality. Means for performing one or more of the illustrated functions can include hardware and/or software means described herein, including one or more of the components of the positioning system 100 of FIG. 1. In some embodiments, a mobile device may perform some or all of the functions illustrated in FIGS. 6A and 6B. In these embodiments, means for performing these functions can include hardware and/or software means as illustrated in FIG. 7 and described below.

The method 600-A includes functions performed at a mobile device during a training phase, as described in the embodiments above. At block 610, a first set of MEMS sensor data is collected from the MEMS-based sensors over a first period of time in which the user makes multiple strides. As previously indicated, strides taken by a user can be determined by a pedometer, which may be implemented by the mobile device. In some embodiments, the mobile device may initiate the training phase through a graphical user interface shown on a display of the mobile device. In these implementations, the mobile device may provide the user with a certain number or minimum amount of strides to take during the first period of time. In some embodiments, the user may interact with the graphical user interface to indicate that the user has completed taking the multiple strides (thereby ending the first period of time). Means for performing the functionality at block 610 can include processing unit(s) 710, output devices 715, wireless communication interface 730, bus 705, sensor(s) 740, memory 760, input devices 770, and/or GNSS receiver 780 of the mobile device as shown in FIG. 7 and described herein below.

At block 620, a movement model is created associated with the first set of MEMS sensor data. As discussed above, the movement model may comprise one or more waveforms created from a plurality of samples of the MEMS sensor data. According to some embodiments, the movement model may be created by first transforming the first set of MEMS sensor data to a different reference frame. For example, the first set of MEMS sensor data may be first be transformed to an ENU reference frame as illustrated in FIG. 2 and described herein above. The movement model is created based on the first set of MEMS sensor data and a reference trajectory to determine a weighting function that amplifies along-track motion over a stride, attenuates cross-track motion over the stride, or both. As previously described, the reference trajectory may be obtained from a source other than the MEMS sensor data, such as a GNSS receiver, wireless communication interface, and/or other component capable of providing the position and/or trajectory of the mobile device. With this reference trajectory, the first set of MEMS sensor data may be transformed into the AXU reference frame, and the weighting function can be determined by amplifying along-track motion, attenuating cross-track motion, or both. In some embodiments, for example, processing unit(s) 710, bus 705, and/or memory 760 (as described below with regard to FIG. 7) may serve as means for transforming the first set of MEMS sensor data to a frame of reference based on the reference trajectory to generate along-track training data and cross-track training data. As previously described, the weighting function can be computed using a least-squares optimization to determine the weighting function that, when applied to each of the along-track and cross-track motion, amplifies the along-track motion relative to the cross-track motion. Furthermore, as described above, one or more reference waveforms can be generated, where the movement model comprises the weighting function and at least one reference waveform. In some embodiments, processing unit(s) 710, bus 705, and/or memory 760 (as described below with regard to FIG. 7) may serve as means for generating the at least one reference waveform. Reference waveforms may correspond with the vertical and/or horizontal movement (acceleration, rotation, and/or the like). The weighting function may therefore comprise a plurality of weights used to modify values of real-time sensor data, as described above with reference to Equations 4 and 5. The reference waveforms can be used to determine if there is a match between real-time sensor data and a stored movement model.

As previously described, embodiments may utilize a plurality of movement models for subsequent identification of movement. Therefore, these embodiments may further collect a plurality of sets of MEMS sensor data and create a plurality of movement models, each movement model of the plurality of movement models corresponding to a set of MEMS sensor data of the plurality of sets of MEMS sensor data.

Means for performing the functionality of block 620 can include processing unit(s) 710, output devices 715, wireless communication interface 730, bus 705, sensor(s) 740, memory 760, input devices 770, and/or GNSS receiver 780 of the mobile device as shown in FIG. 7 and described herein below.

The method 600-B includes functions performed at a mobile device subsequent to the training phase (e.g., in an identification phase), as described in the embodiments above. At block 640, a second set of MEMS sensor data is collected from the MEMS-based sensors over a second period of time in which motion is detected by the MEMS-based sensors. According to some embodiments, the collection of the second set of MEMS sensor data may be automatic (which may be unlike the collection of the first set of MEMS sensor data during the training phase, which may, in some embodiments, need explicit user input). Here, the second set of MEMS sensor data may include data from the same MEMS as those of the first set of MEMS sensor data. Means for performing this functionality can include processing unit(s) 710, bus 705, sensor(s) 740, and/or memory 760, of the mobile device as shown in FIG. 7 and described herein below.

At block 650, it is determined if the second set of MEMS sensor data is matches the movement model. As indicated in the embodiments described herein, this matching may include transforming the second set of MEMS sensor data to a ENU reference frame and comparing one or more waveforms of the second set of MEMS sensor data to corresponding one or more reference waveforms of various motion models. The mobile device can then determine a "match" when the comparison determines that the waveforms are substantially similar. As noted previously, this determination may be made by performing a correlation operation between, for example, one waveform of the second set of MEMS sensor data and a reference waveform. If the correlation operation results in a correlation value at least as great as a threshold correlation value. This correlation operation may be agnostic to time offsets between the waveforms, or may be configured to include in either or both the waveforms a time (phase) offset, or a plurality of time (phase) offsets. If a match is found, the correlation operation may also provide a phase or time offset in order to properly apply the weighting function to the transformed second set of MEMS sensor data. Means for performing the functionality at block 650 can include processing unit(s) 710, bus 705, and/or memory 760 of the mobile device as shown in FIG. 7 and described herein below.

The functionality at block 660 includes determining a location of the mobile device using the second set of MEMS sensor data by applying the weighting function corresponding to the movement model to the second set of MEMS sensor data, responsive to a determination of a match between the second set of MEMS sensor data and the movement model. Once the second set of MEMS sensor data is matched to the movement model (e.g., one or more waveforms of the second set of MEMS sensor data is determined to be substantially similar to corresponding one or more waveforms of a movement model at block 650, the corresponding weighting function of that movement model is applied to the MEMS sensor data. This helps amplify along-track movement and/or attenuate cross-track movement in the second set of MEMS sensor data, which can provide for a more accurate COG estimate used to determine the location of the mobile device. As illustrated in the embodiments described herein, applying the weighting function can be a matter of, where the weighting function is nonzero, multiplying the nonzero values of the weighting function to corresponding samples of, for example, (transformed) east-axis acceleration data and north-axis acceleration data of the second set of MEMS sensor data. As noted above, if there is no determination of a match between the second set of MEMS sensor data and any stored movement model, the mobile device may enter the training phase using the second set of MEMS sensor data. Means for performing this functionality can include processing unit(s) 710, bus 705, and/or memory 760 of the mobile device as shown in FIG. 7 and described herein below.

FIG. 7 is a block diagram an embodiment of a mobile device 105, which can be utilized as described herein above. For example, the mobile device 105 can be used in the positioning system 100 of FIG. 1, perform some or all of the methods 600-A and/or 600-B of FIGS. 6A and 6B, and/or used as generally described in the embodiments detailed herein. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations.

The mobile device 105 is shown comprising hardware elements that can be electrically coupled via a bus 705 (or may otherwise be in communication, as appropriate). The hardware elements may include a processing unit(s) 710 which may comprise without limitation one or more general-purpose processors, one or more special-purpose processors (such as digital signal processing (DSP) chips, graphics acceleration processors, application specific integrated circuits (ASICs), field-programmable gate arrays (FPGAs) and/or the like), and/or other processing structure or means, which can be configured to perform one or more of the methods described herein. As shown in FIG. 7, some embodiments may have a separate DSP 720, depending on desired functionality. In some embodiments processing unit(s) 710 and/or the memory 760 can serve as means for collecting motion data (e.g., during and/or subsequent to the training phase), creating a movement model, determining if motion data matches a movement model, and/or determining a location of the mobile device (or other apparatus) using motion data by applying a weighting function corresponding to a movement model to the motion data, as previously described herein. The mobile device 105 also may comprise one or more input devices 770, which may comprise without limitation one or more touch screens, touch pads, microphones, buttons, dials, switches, and/or the like; and one or more output devices 715, which may comprise without limitation, one or more displays, light emitting diodes (LEDs), speakers, and/or the like.

The mobile device 105 might also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi® device, a WiMAX® device, cellular communication circuitry, etc.), and/or the like. The wireless communication interface 730 may permit data (such as location information and/or location assistance information as described in the embodiments herein) to be communicated with a network, wireless access points, computer systems, and/or any other wireless electronic devices described herein, including the devices illustrated in FIG. 1. The communication can be carried out via one or more wireless communication antenna(s) 732 that send and/or receive wireless signals 734.

Depending on desired functionality, the wireless communication interface 730 may comprise separate transceivers to communicate with base transceiver stations (e.g., antenna 120 of FIG. 1) and other wireless devices and access points. Different data networks may comprise various network types. The wireless communication interface 730 may communicate with a Wireless Wide Area Network (WWAN), which may comprise a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 702.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless data network as described herein may comprise a wireless local area network (WLAN) which may be an IEEE 802.11x network, and a wireless personal area network (WPAN) may comprise a Bluetooth® network, an IEEE 802.15x, or some other type of network. The techniques described herein may also be used for any combination of WWAN, WLAN and/or WPAN.

The mobile device 105 can further include sensor(s) 740. Such sensors may comprise one or more MEMS or non-MEMS sensors as described herein, including, without limitation, one or more accelerometers, gyroscopes, cameras, magnetometers, altimeters, barometers, microphones, proximity sensors, light sensors, and the like, and, in some embodiments, such sensor(s) 740 can serve as means for detection motion. Some or all of the sensor(s) 740 can be utilized as described herein to determine movement, including steps (or strides) of a user. As such, the sensor(s) 740, alone or in conjunction with processing unit(s) 710 and/or other components of the mobile device 105, can be used to implement a pedometer as described herein. Sensor(s) 740 may be used in additional or alternative manners to facilitate a positioning determination by a positioning system (such as positioning system 100 of FIG. 1) by providing measurements for COG as described herein.

Embodiments of the mobile device may also include GNSS receiver 780 capable of receiving signals 784 from one or more GNSS SVs (such as GNSS SVs 110, of FIG. 1) using an GNSS antenna 782. Such positioning can be utilized to complement and/or incorporate the techniques described herein. The GNSS receiver 780 can extract a position of the mobile device, using conventional techniques, from GNSS SVs of a GNSS system, such as Galileo, GLONASS, Compass, Quasi-Zenith Satellite System (QZSS) over Japan, Indian Regional Navigational Satellite System (IRNSS) over India, Beidou over China, and/or the like. Moreover, the GNSS receiver 780 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an GNSS may include any combination of one or more global and/or regional navigation satellite systems and/or augmentation systems, and GNSS signals may include GNSS, GNSS-like, and/or other signals associated with such one or more GNSS. In other words, GNSS system may comprise any type of Satellite Positioning System (SPS).

The mobile device 105 may further include and/or be in communication with a memory 760. The memory 760 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 760 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as computer-executable code and/or instructions executable by the mobile device 105 (e.g., by processing unit(s)) and/or another device of a positioning system. In an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the memory 760 described above. These instructions might take the form of executable code, which is executable by the mobile device 105 and/or might take the form of source and/or installable code, which, upon compilation and/or installation on the mobile device 105 (e.g., using any of a variety of generally available compilers, installation programs, compression/decompression utilities, etc.), then takes the form of executable code.

The techniques described herein may be implemented by various means depending upon applications according to particular features and/or examples. For example, such methodologies may be implemented in hardware, firmware, and/or combinations thereof, along with software. In a hardware implementation, for example, a processing unit (e.g., processing unit(s) 710) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform, such as the memory 760 of the mobile device 105 shown in FIG. 7. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A mobile device comprising:
   one or more micro electromechanical system (MEMS)-based sensors configured to provide MEMS sensor data indicative of motion of a user within a horizontal plane;
   a processing unit communicatively coupled with the MEMS-based sensors and configured to:
   in a training phase:
      collect, from the MEMS-based sensors, a first set of MEMS sensor data over a first period of time in which the user makes multiple strides;
      obtain, from a source other than first set of MEMS sensor data, a reference trajectory defining a primary direction of movement of the mobile device within the horizontal plane during the first period of time;
      determine, from the first set of MEMS sensor data, along-track motion in the direction of the reference trajectory and cross-track motion perpendicular to the direction of the reference trajectory within the horizontal plane; and
      create a movement model associated with the first set of MEMS sensor data based on the first set of MEMS sensor data and the reference trajectory to determine a weighting function that amplifies the along-track motion over a stride, attenuates the cross-track motion over the stride, or both; and subsequent to the training phase:
collect, from the MEMS-based sensors, a second set of MEMS sensor data over a second period of time in which motion is detected by the MEMS-based sensors;
determine if the second set of MEMS sensor data matches the movement model; and
responsive to a determination of a match between the second set of MEMS sensor data and the movement model, determine a location of the mobile device using the second set of MEMS sensor data by applying the weighting function corresponding to the movement model to the second set of MEMS sensor data.

2. The mobile device of claim 1, further comprising a global navigation satellite system (GNSS) receiver communicatively coupled with the processing unit, wherein the processing unit is further configured to determine the reference trajectory using information received from the GNSS receiver.

3. The mobile device of claim 1, wherein the processing unit is further configured to, in the training phase:
collect a plurality of sets of MEMS sensor data; and
create a plurality of movement models, each movement model of the plurality of movement models corresponding to a set of MEMS sensor data of the plurality of sets of MEMS sensor data.

4. The mobile device of claim 1, wherein the processing unit is configured to create the movement model based on the first set of MEMS sensor data and the reference trajectory comprises transforming the first set of MEMS sensor data to a frame of reference based on the reference trajectory to generate along-track training data and cross-track training data.

5. The mobile device of claim 4, wherein the processing unit is configured to determine the weighting function by performing a least squares optimization based on the along-track training data and the cross-track training data.

6. The mobile device of claim 1, wherein the processing unit is further configured to generate at least one reference waveform, wherein the movement model comprises the weighting function and the at least one reference waveform.

7. The mobile device of claim 6, wherein the at least one reference waveform includes a waveform representing vertical movement of the mobile device.

8. The mobile device of claim 7, wherein the processing unit is configured to determine if the second set of MEMS sensor data matches the movement model based on a waveform derived from the second set of MEMS sensor data and the at least one reference waveform of the movement model.

9. The mobile device of claim 8, wherein the processing unit is configured to determine if the waveform derived from the second set of MEMS sensor data matches the at least one reference waveform of the movement model by performing a correlation operation.

10. The mobile device of claim 9, wherein the processing unit is configured to perform the correlation operation by including, in the waveform derived from the second set of MEMS sensor data, the at least one reference waveform of the movement model, or both, a time offset.

11. The mobile device of claim 9, wherein the processing unit is configured to determine if the second set of MEMS sensor data matches the movement model by determining that a value of the correlation operation is at least as great as a threshold correlation value.

12. A method of pedestrian motion modeling in a mobile device having one or more micro electromechanical system (MEMS)-based sensors, the method comprising:
in a training phase:
collecting, from the MEMS-based sensors, a first set of MEMS sensor data indicative of motion of a user within a horizontal plane, the first set of MEMS sensor data collected over a first period of time in which the user makes multiple strides;
obtaining, from a source other than the first set of MEMS sensor data, a reference trajectory defining a primary direction of movement of the mobile device within the horizontal plane during the first period of time;
determining along-track motion in the direction of the reference trajectory and cross-track motion perpendicular to the direction of the reference trajectory within the horizontal plane; and
creating a movement model associated with the first set of MEMS sensor data based on the first set of MEMS sensor data and the reference trajectory to determine a weighting function that amplifies the along-track motion over a stride, attenuates the cross-track motion over the stride, or both; and
subsequent to the training phase:
collecting, from the MEMS-based sensors, a second set of MEMS sensor data over a second period of time in which motion is detected by the MEMS-based sensors;
determining if the second set of MEMS sensor data matches the movement model; and
responsive to a determination of a match between the second set of MEMS sensor data and the movement model, determining a location of the mobile device using the second set of MEMS sensor data by applying the weighting function corresponding to the movement model to the second set of MEMS sensor data.

13. The method of claim 12, further comprising determining the reference trajectory using information received from a global navigation satellite system (GNSS) receiver of the mobile device.

14. The method of claim 12, further comprising, in the training phase:
collecting a plurality of sets of MEMS sensor data; and
creating a plurality of movement models, each movement model of the plurality of movement models corresponding to a set of MEMS sensor data of the plurality of sets of MEMS sensor data.

15. The method of claim 12, wherein creating the movement model based on the first set of MEMS sensor data and the reference trajectory comprises transforming the first set of MEMS sensor data to a frame of reference based on the reference trajectory to generate along-track training data and cross-track training data.

16. The method of claim 15, wherein determining the weighting function comprises performing a least squares optimization based on the along-track training data and the cross-track training data.

17. The method of claim 12, further comprising generating at least one reference waveform, wherein the movement model comprises the weighting function and the at least one reference waveform.

18. The method of claim 17, wherein the at least one reference waveform includes a waveform representing vertical movement of the mobile device.

19. The method of claim 18, wherein determining if the second set of MEMS sensor data matches the movement model is based on a waveform derived from the second set of MEMS sensor data and the at least one reference waveform of the movement model.

20. The method of claim 19, wherein determining if the waveform derived from the second set of MEMS sensor data matches the at least one reference waveform of the movement model comprises performing a correlation operation.

21. The method of claim 20, wherein performing the correlation operation comprises including, in the waveform derived from the second set of MEMS sensor data, the at least one reference waveform of the movement model, or both, a time offset.

22. The method of claim 20, wherein determining if the second set of MEMS sensor data matches the movement model comprises determining that a value of the correlation operation is at least as great as a threshold correlation value.

23. An apparatus comprising:
means for detecting motion;
means for collecting, in a training phase, a first set of motion data from the means for detecting motion, the first set of motion data indicative of motion of a user within a horizontal plane and collected over a first period of time in which the user makes multiple strides;
means obtaining, in the training phase and from a source other than the first set of motion data, a reference trajectory defining a primary direction of movement of the mobile device within the horizontal plane during the first period of time;
means for determining, in the training phase, along-track motion in the direction of the reference trajectory and cross-track motion perpendicular to the direction of the reference trajectory within the horizontal plane;
means for creating, in the training phase, a movement model associated with the first set of motion data based on the first set of motion data and the reference trajectory to determine a weighting function that amplifies the along-track motion over a stride, attenuates the cross-track motion over the stride, or both;
means for collecting, subsequent to the training phase, a second set of motion data from the means for detecting motion, the second set of motion data collected over a second period of time in which motion is detected;
means for determining if the second set of motion data matches the movement model; and
means for determining, responsive to a determination of a match between the second set of motion data and the movement model, a location of the apparatus using the second set of motion data by applying the weighting function corresponding to the movement model to the second set of motion data.

24. The apparatus of claim 23, further comprising means for determining the reference trajectory using information received from a global navigation satellite system (GNSS) receiver.

25. The apparatus of claim 23, further comprising:
means for collecting, in the training phase, a plurality of sets of motion data; and
means for creating, in the training phase, a plurality of movement models, each movement model of the plurality of movement models corresponding to a set of motion data of the plurality of sets of motion data.

26. The apparatus of claim 23, wherein the means for creating the movement model based on the first set of motion data and the reference trajectory comprises means for transforming the first set of MEMS sensor data to a frame of reference based on the reference trajectory to generate along-track training data and cross-track training data.

27. The apparatus of claim 26, wherein the means for determining the weighting function comprises means for performing a least squares optimization based on the along-track training data and the cross-track training data.

28. The apparatus of claim 23, further comprising means for generating at least one reference waveform, wherein the movement model comprises the weighting function and the at least one reference waveform.

29. The apparatus of claim 28, wherein the at least one reference waveform includes a waveform representing vertical movement of the mobile device.

30. A non-transitory computer-readable medium having computer-executable instructions embedded thereon for pedestrian motion modeling in a mobile device having one or more micro electromechanical system (MEMS)-based sensors, the computer-executable instructions including computer code for:
in a training phase:
collecting, from the MEMS-based sensors, a first set of MEMS sensor data indicative of motion of a user within a horizontal plane, the first set of MEMS sensor data collected over a first period of time in which the user makes multiple strides;
obtain, from a source other than the first set of MEMS sensor data, a reference trajectory defining a primary direction of movement of the mobile device within the horizontal plane during the first period of time;
determine along-track motion in the direction of the reference trajectory and cross-track motion perpendicular to the direction of the reference trajectory within the horizontal plane; and
creating a movement model associated with the first set of MEMS sensor data based on the first set of MEMS sensor data and the reference trajectory to determine a weighting function that amplifies the along-track motion over a stride, attenuates the cross-track motion over the stride, or both; and
subsequent to the training phase:
collecting, from the MEMS-based sensors, a second set of MEMS sensor data over a second period of time in which motion is detected by the MEMS-based sensors;
determining if the second set of MEMS sensor data matches the movement model; and
responsive to a determination of a match between the second set of MEMS sensor data and the movement model, determining a location of the mobile device using the second set of MEMS sensor data by applying the weighting function corresponding to the movement model to the second set of MEMS sensor data.

* * * * *